United States Patent
Lee et al.

(10) Patent No.: US 6,789,120 B1
(45) Date of Patent: Sep. 7, 2004

(54) REAL-TIME AUDIO/VIDEO COMMUNICATION METHOD FOR USE ON THE INTERNET AND DEVICE THEREFOR

(75) Inventors: Hoon-ki Lee, Pucheon (KR); Yoon-soo Kim, Seongnam (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 554 days.

(21) Appl. No.: 09/695,843

(22) Filed: Oct. 26, 2000

(30) Foreign Application Priority Data

Oct. 26, 1999 (KR) ........................................ 1999-46626

(51) Int. Cl.[7] .............................................. G06F 15/16
(52) U.S. Cl. .................... 709/227; 709/204; 379/90.01; 379/93.35; 370/352
(58) Field of Search ................................ 709/227, 204, 709/205; 370/352; 379/93.04, 93.17, 93.25, 90.01, 93.35; 345/753, 756

(56) References Cited

U.S. PATENT DOCUMENTS

| | | | | |
|---|---|---|---|---|
| 6,011,794 A | * | 1/2000 | Mordowitz et al. | 370/389 |
| 6,081,830 A | * | 6/2000 | Schindler | 709/204 |
| 6,192,050 B1 | * | 2/2001 | Stovall | 370/389 |
| 6,282,269 B1 | * | 8/2001 | Bowater et al. | 379/88.17 |
| 6,301,607 B2 | * | 10/2001 | Barraclough et al. | 709/204 |
| 6,304,565 B1 | * | 10/2001 | Ramamurthy | 370/352 |
| 6,337,858 B1 | * | 1/2002 | Petty et al. | 370/356 |
| 6,339,594 B1 | * | 1/2002 | Civanlar et al. | 370/352 |
| 6,341,128 B1 | * | 1/2002 | Svedberg | 370/352 |
| 6,351,464 B1 | * | 2/2002 | Galvin et al. | 370/356 |
| 6,463,146 B1 | * | 10/2002 | Hartley et al. | 379/215.01 |
| 6,466,570 B1 | * | 10/2002 | Low et al. | 370/352 |
| 6,526,131 B1 | * | 2/2003 | Zimmerman et al. | 379/106.09 |
| 6,529,501 B1 | * | 3/2003 | Zhao et al. | 370/353 |
| 6,539,421 B1 | * | 3/2003 | Appelman et al. | 709/206 |
| 2002/0009071 A1 | * | 1/2002 | Yaary et al. | 370/352 |
| 2002/0085542 A1 | * | 7/2002 | Bedingfield et al. | 370/352 |
| 2003/0095542 A1 | * | 5/2003 | Chang et al. | 370/352 |

FOREIGN PATENT DOCUMENTS

| | | | |
|---|---|---|---|
| EP | 000856981 A2 | * 8/1998 | ............ H04M/7/00 |
| JP | 9-168033 | 6/1997 | |
| JP | 10-155034 | 6/1998 | |
| JP | 11-041294 | 2/1999 | |
| JP | 2002-502155 | 1/2002 | |
| WO | WO 99/38310 | 7/1999 | |

OTHER PUBLICATIONS

Metcalfe, "eFusion Lets You Use a Single Telephone Line to View a Web Page and Talk on the Phone," Mar. 16, 1998, InfoWorld, vol. 20, Issue 11, pp. 93ff.*

* cited by examiner

Primary Examiner—Glenton B. Burgess
Assistant Examiner—Bradley Edelman
(74) Attorney, Agent, or Firm—Sughrue Mion, PLLC

(57) ABSTRACT

A real-time audio/video communication method for use on the Internet in conjunction with a homepage and a device therefor are provided. According to the method of a real-time audio/video communication between each terminal using the Internet, the communication capability and the current status of a receiving party are registered in a homepage within a terminal or a web server connected by the receiver, and a sending party accesses the receiver's homepage within the web server to initiate communication. This method allows the receiver to receive realtime audio/video communication data at any time without being always connected to the Internet. Furthermore, in the real-time audio/video communication device, an Internet Service Provider provides a homepage so that the ISP may recognize the communication status of each terminal to access the sending and receiving terminals under optimum communication conditions, and decodes the optimum communication conditions.

11 Claims, 7 Drawing Sheets

FIG. 2B

Kim Yoon Soo's Home Page

210

My Information:
Internet OnLine : Yes (v) No ( )
Line Used : PSTN (v) ISDN( ) LAN( )
Terminal used : (Samsung WVP2.0 )
Video : Enable (v) Disable ( )
Audio : Enable (v) Disable ( )
— 220

If you want to call me click the above image — 230

For caller's choice :

| call type ↓ | video type ↓ | audio type ↓ | bandwidth ↓ |
|---|---|---|---|
| Analog Audio | H263 CIF | G.723.1 | 28.8 kbps |
| Digital Audio | H263 QCIF | G.729 | 33.6 kbps |
| Digital A/V | H261 CIF | G.711 | 50 kbps |
|  | H261 QCIF |  | 1 Mbps |

```
                Kim Yoon Soo's Home Page
         210
              ┌─────────────────────────────────────┐
              │ My Information:                     │
              │ Internet OnLine : Yes ( ) No (v)    │
              │ Line Used : PSTN (v) ISDN( ) LAN( ) │──220
              │ Terminal used : (Samsung WVP 2.0)   │
              │ Video : Enable (v) Disable ( )      │
              │ Audio : Enable (v) Disable ( )      │
              └─────────────────────────────────────┘

If you want to call me click the above image        ──230

For caller's choice :
         | call type | ↓ | video type | ↓ | audio type | ↓ | bandwidth | ↓ |

Analog Audio    H263 CIF      G.723.1      28.8 kbps       ──240
         Digital Audio   H263 QCIF     G.729        33.6 kbps
         Digital A/V     H261 CIF      G.711        50 kbps
                         H261 QCIF                  1 Mbps
```

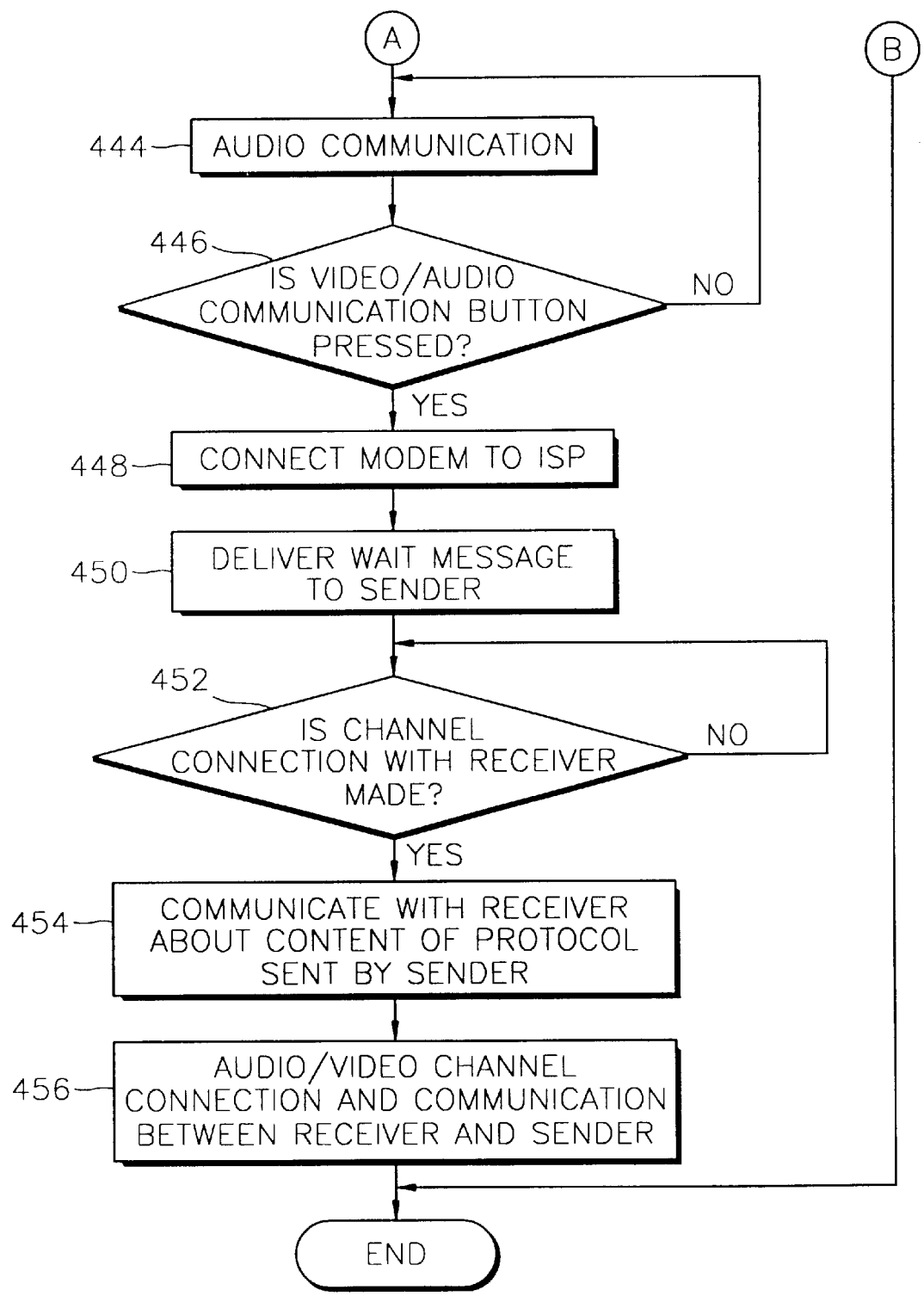

REAL-TIME AUDIO/VIDEO COMMUNICATION METHOD FOR USE ON THE INTERNET AND DEVICE THEREFOR

BACKGROUND OF THE INVENTION

1. Field of the Invention

The present invention relates to a real-time communication method and a device therefor, and more particularly, to a real-time audio/video communication method for use on the Internet in conjunction with a homepage, and a device using the same.

2. Description of the Related Art

The Internet has been so far developed around data traffic such as e-mail or web, but with the advent of applications such as distance learning and teleconferencing, which require real-time traffic delivery, the Internet is progressing towards real-time traffic such as audio/video communication. An Internet browser is a tool for facilitating access to web information using Internet communication. A Voice over Internet Protocol (VOIP) is a kind of real-time communication technology using the Internet.

According to conventional Internet communication, if one user wishes to communicate with another on the Internet, the user calls the other party already connected to the Internet, using the other party's IP address. To this end, the user must know, in advance, the relevant IP address. Typically, an IP address can be obtained by using one or more of the following methods: a) obtaining the IP address from a given address book; b) accessing another server having a function similar to a telephone directory to obtain IP addresses of other users already connected to the server, and c) obtaining the IP address from a web server.

Thus, assuming that one is already aware of the other party's IP address through the above methods, and if the other party is connected to the Internet, an audio/video communication link is enabled by a VoIP or a H.323 protocol. In this case, H.323 is a protocol for implementing a multimedia conferencing system including audio, video and data on a local area network (LAN) which does not provide a guaranteed quality of service.

Furthermore, the conventional Internet communication method is available only to users already connected to the Internet, so an Internet communication line needs to be open at all times. This does not make much difference to users who adopt a LAN network since the network is always open and users do not need to individually access the Internet. In contrast, in the case of users at home who access an Internet Service Provider (ISP) via a local telephone line to use an Internet communication line, if the users use the Internet actively, e.g., for web surfing and e-mail or for making an audio/video telephonic communication as a caller, they can easily handle an incoming call since they are presently connected to the ISP. However, if the users do not use it actively, they have to be continuously logged onto the ISP in order to handle an incoming call, which increases the communication cost.

Of course, there is no problem if the users use two telephone lines, one of which is dedicated to analog communication for a general telephone and the other dedicated to digital communication for the Internet. However, most users use both a general telephone and the Internet over a single telephone line, in which case they have to be continuously connected to the ISP to receive an incoming call. This produces a problem in that it is impossible to use the general telephone because the phone is always in a busy state.

SUMMARY OF THE INVENTION

To solve the above problem, it is a first object of the present invention to provide a real-time audio/video communication method wherein, in Internet-based communication between two or more terminals, the communication capability and the current status of a receiving party are both registered at the terminals or in a homepage within a web-server accessed by the receiver, and then the sending party accesses the receiver's homepage within the web-server to initiate communication, thereby allowing the receiver to receive real-time audio/video data at any time without the need for a continuous connection to the Internet.

It is a second object of the present invention to provide a real-time audio/video communication device that provides a homepage so that an Internet Service Provider (ISP) can recognize the communication status of each terminal so that it can access the sending/receiving terminals in real-time under optimum communication conditions, and which decodes the optimum communication conditions.

To achieve the first object, an embodiment of the present invention provides a method for real-time communication between sending and receiving terminals in an Internet communications system in which an Internet Service Provider (ISP) is connected between the sending and receiving terminals. The method includes having the ISP check whether or not the receiving terminal is connected through a subscriber's database to create a homepage in which the network connection status of the receiving terminal is indicated, registering the ISP's Internet Protocol (IP) address if the receiving terminal is not connected, and registering an IP address assigned to the receiving terminal if the receiving terminal is connected; and having the ISP connect the sending terminal with Voice over Internet Protocol (VoIP), and at the same time initiating a telephone call using the telephone number of the corresponding receiving terminal if a web-browser of the sending terminal decodes and calls an IP address in the created homepage.

An embodiment of the present invention also provides a communication method used by, for example, an Internet Service Provider (ISP) to connect sending and receiving terminals in real-time in an Internet communications system in which the ISP is connected between the sending and receiving terminals, the method including checking whether or not the receiving terminal is connected to the Internet through a subscriber's database to create a homepage in which a network connection status of the receiving terminal is indicated, registering the ISP Internet Protocol (IP) address if the receiving terminal is not connected, and registering an IP address assigned to the receiving terminal if the receiving terminal subscriber is connected; initiating a predetermined communication start-up protocol to connect the sending terminal with a Voice over Internet Protocol (VoIP), and at the same time calling a telephone number of the corresponding receiving terminal if an IP address registered in the created homepage is decoded and called by a web-browser of the sending terminal; and connecting a receiving terminal and a digital communications channel to transmit a standard video/audio protocol to the receiving terminal if video/audio communication is requested from the sending terminal during the telephone call.

To achieve the second object of the present invention, an embodiment of the present invention provides a real-time communication device in an Internet communication system in which real-time communication is available, the device includes a terminal for checking which network is established at an initial stage to set up a telephone number of an Internet Service Provider (ISP) in a homepage if a receiver is not connected to the Internet and to establish an Internet Protocol (IP) address in the homepage if the receiver is connected to the Internet; and an ISP which, if the homepage is accessed by a web-browser of the terminal, creates a homepage in which the network connection status of the receiver available from a subscriber's database is indicated and in which the IP address of the ISP is registered, and if the registered IP address is called by the terminal, places a telephone call with a sender via a Voice over Internet Protocol (VoIP) and with the corresponding receiver at a predetermined telephone number.

BRIEF DESCRIPTION OF THE DRAWINGS

The above-mentioned objects and advantages of the present invention will become more apparent by describing in detail preferred embodiments thereof with reference to the attached drawings in which:

FIGS. 2A–2C show embodiments of homepages;

FIGS. 4A and 4B are flowcharts showing a real-time audio/video connection method if the receiver in FIG. 3 is not connected to the Internet network.

DESCRIPTION OF THE PREFERRED EMBODIMENTS

Figure 1A:
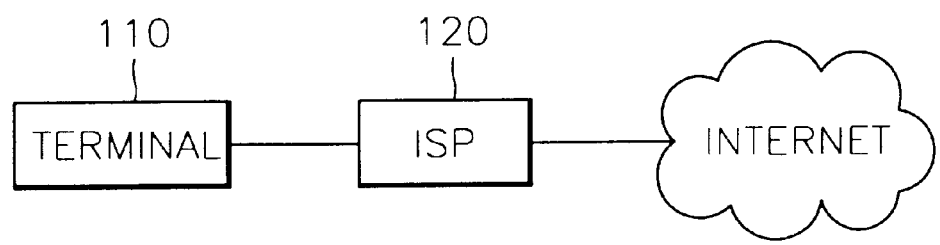
FIG. 1A is a block diagram showing a communications system that adopts a Public Switched Telephone Network (PSTN)/Integrated Services Digital Network (ISDN)

Referring to FIG. 1A, a sending terminal 110 can be embodied as a personal computer or a web video phone, and the sending terminal 110 sends and receives audio/video signals with a receiving terminal (not shown). The sending terminal 110 interprets a Hypertext Transfer Protocol (HTTP) to display the corresponding content, runs protocols such as H.323, Q931, and H.245 according to Internet Protocol (IP) address information, receives a new capability table from the receiving party, and closes a data channel after checking a preference of a capability table and re-opens the data channel.

An Internet Service Provider (ISP) 120 runs Q931 and H.245 protocols to solve problems which may occur due to inconsistency in transmission form, communication process, and the form of media such as audio and video. Specifically, a homepage is assigned to the receiving party to indicate the access state of the receiving party. If an IP address is input to show that the receiving party is presently connected to the network, then the allotted IP address is displayed. If, on the other hand, the receiving party is not connected to a network, then a free IP address is displayed. Furthermore, the ISP 120 runs the Q931 protocol to perform conversion between digital audio and analog audio, makes a phone call to a receiver to display predetermined telephone information if a sender calls in a disconnection state, and converts an audio mode to digital audio/video mode.

Figure 1B:
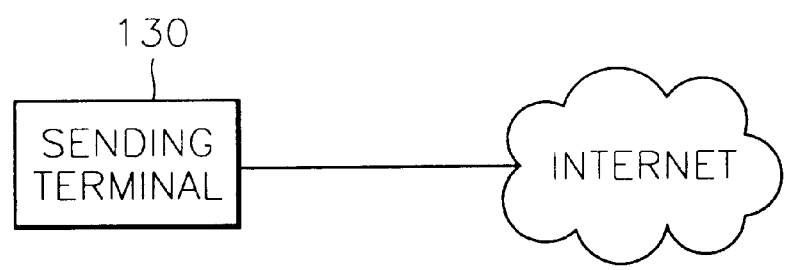
FIG. 1B is a block diagram showing a communications system that adopts a local area network (LAN)

In FIG. 1B, which shows a communications system when a Local Area Network (LAN) is adopted, since a receiving terminal (not shown) using the LAN or Internet network is always connected to the Internet, it allows a sending terminal 130 to contact the receiving terminal directly without any need to call an ISP.

Figure 2A:
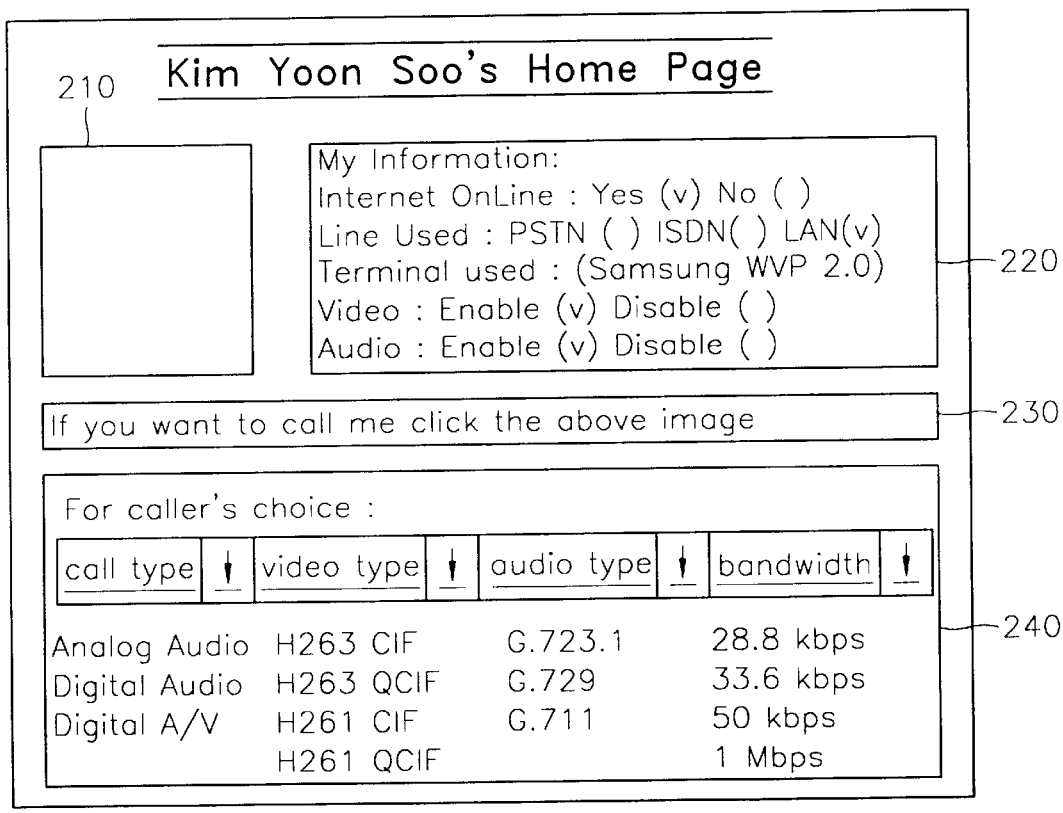

FIGS. 2A–2C show embodiments of a receiver's homepage which the ISP 120, a separate server, or an Internet server has within itself. FIG. 2A is an example of a homepage when the receiver is connected to a LAN or the Internet, FIG. 2B is an example of a homepage when the receiver is connected to a PSTN, and FIG. 2C is an example of a homepage that has been automatically updated by the ISP 120 to indicate that the Internet is off-line.

The homepages in FIGS. 2A–2C include a user data window 210 showing information related to the receiver, an information window 220 showing information about the current network connection status, the type of line used, audio/video support or the like, a call button window 230 for calling a receiver, and a caller choice window 240 showing convertible menus which the receiver currently supports so that a sender may select a desired communication mode. If the sender clicks on a photo within the user data window 210 or the call button 230 after choosing the desired communication mode, information about the IP address assigned to the receiver is available.

In this case, a web-browser (not shown) within the sending terminal 110 initiates a call by Voice over Internet Protocol (VoIP)/H.323 protocol standards, using an IP address contained in a Hypertext Markup Language (HTML) formatted webpage. Since the receiver is not always connected to the Internet, the ISP 120 offers the receiver's homepage as shown in FIGS. 2A–2C to the sending terminal 110, and modifies the connection state or information on a receiver in the homepage according to the current sender's status.

Figure 3:
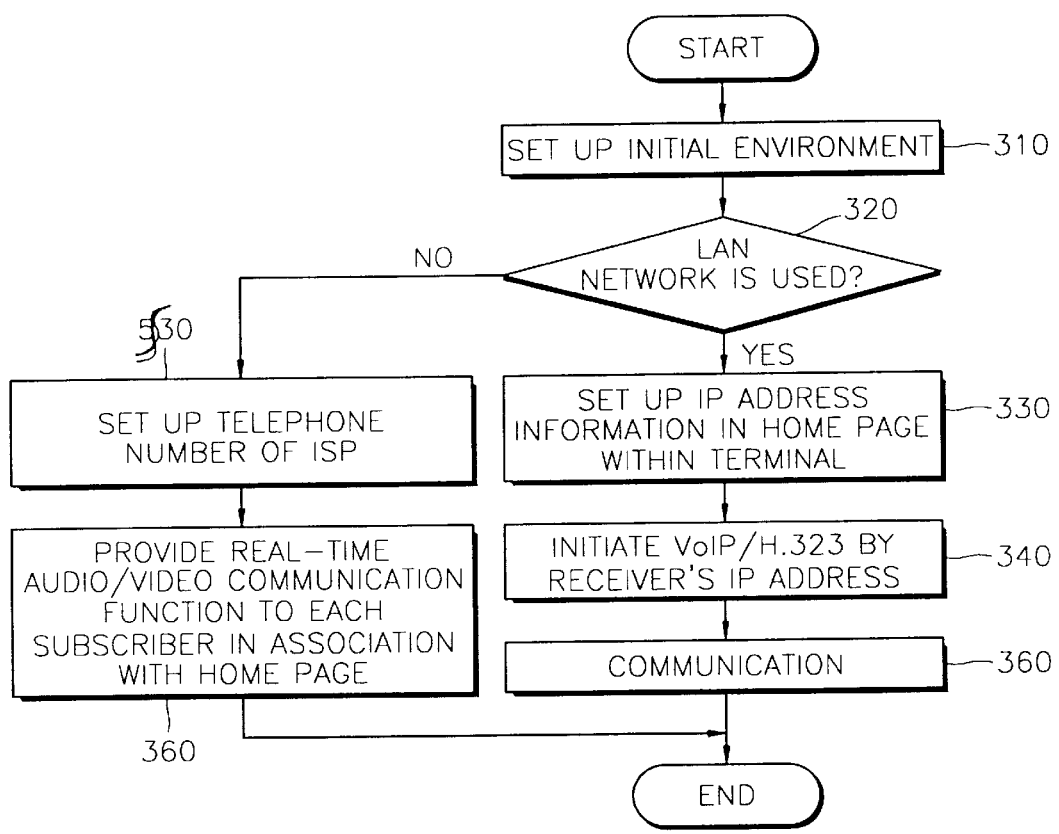
FIG. 3 is a flowchart showing a real-time audio/video connection method on the Internet according to the present invention.

FIG. 3 is a flowchart showing a real-time audio/video connection method for the Internet according to the present invention. Initially, the sending terminal 110 establishes an initial environment for using either a PSTN/ISDN or LAN (step 310). The sending terminal 110 checks whether the initially established network is a PSTN/ISDN or LAN (step 320). If the receiver uses a PSTN/ISDN, the sending terminal 110 sets up the telephone number of the ISP 120 (step 350). Subsequently, the ISP 120 set up by the sending terminal 110 provides each s subscriber with a real-time audio/video communication function in association with a homepage (step 360).

If the receiver uses the LAN network as shown in FIG. 1B, the receiver is always connected to the network, so there is no need to make a phone call to the ISP 120. In this case, an HTTP server within the terminal 130 provides a homepage accessed by the sending terminal 130. The sending terminal 130 must be equipped with methods of making a homepage and information modification. Therefore, the sending terminal 130 displays a homepage indicating that an Internet is online, as shown in FIG. 2A, the sender establishes an IP address by a call button of the homepage (step 330). Subsequently, when the sender accesses the receiver's homepage, the web-browser of the sending terminal 130 directly initiates VoIP/H.323 protocols using the receiver's IP address contained in an HTML formatted web-page to make audio/video communication (steps 340 and 350) with the receiver.

Figure 4A:
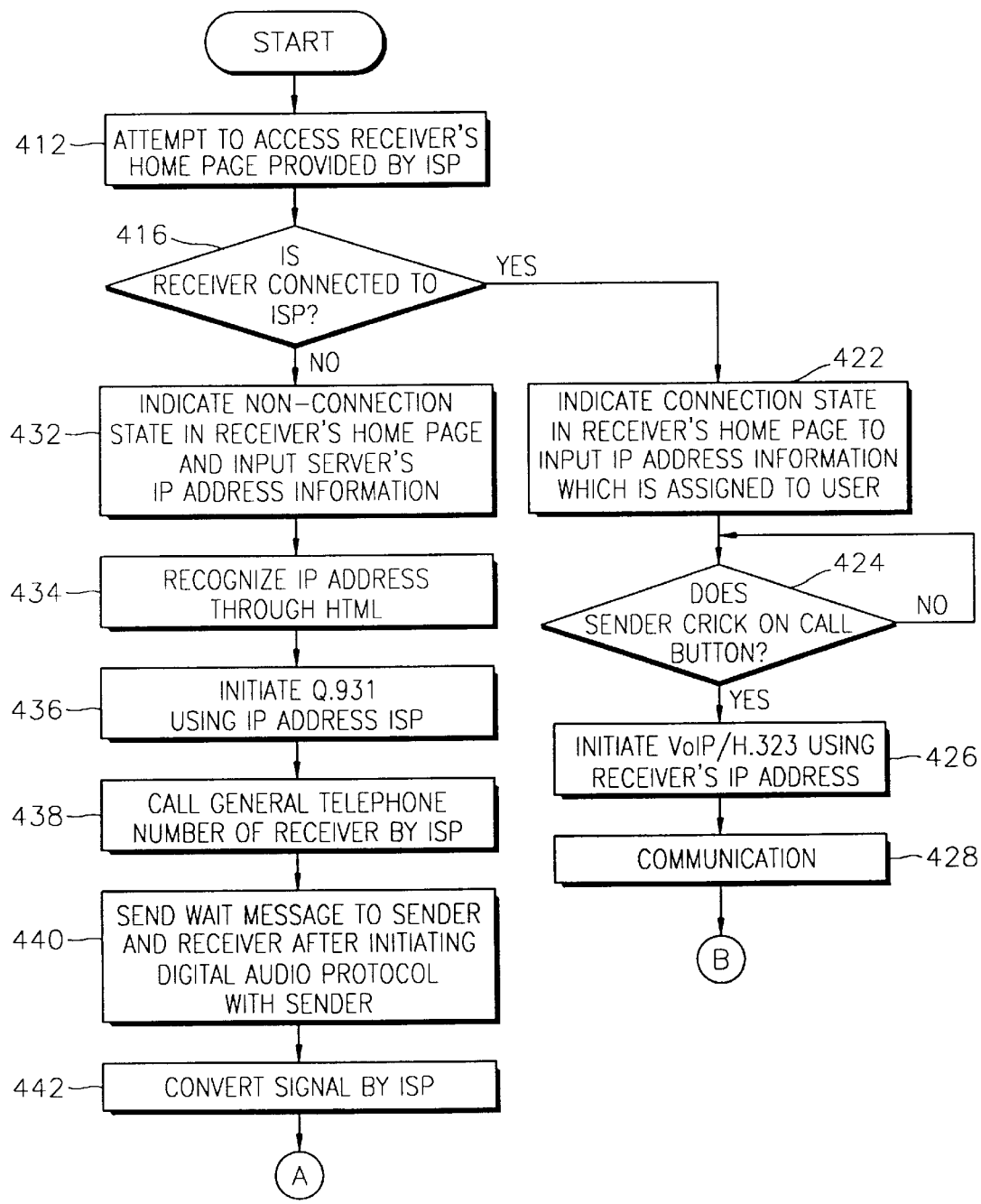

FIGS. 4A and 4B are flowcharts showing real-time audio/video connection methods, which are used if the receiver in FIG. 3 is not connected to the LAN. At the outset, the sending terminal 110 attempts to access a receiver's homepage provided by the ISP 120 (step 412). In this case, the receiver who is not connected to the ISP 120 does not yet have an IP address, so IP address information about the ISP 120 has to be input. If the ISP 120 does not recognize that the receiver is connected to the ISP 120 through a user or subscriber database (step 416), then as shown in FIG. 2C it indicates a disconnection state within the information window 220 in the receiver's homepage as "Internet Online: Yes( ) No(☐)", and registers IP address information about the ISP 120 at the call button window 230 (step 432). Then, if the sender clicks the call button window 230, located on the receiver's homepage, the web-browser of the sending terminal 110 recognizes the IP address of the ISP 120 through HTML (step 434). The sending terminal 110 initiates Q.931, which is a communication start standard protocol, in which case the recognized IP address of ISP 120 becomes the destination (step 436).

Next, in response to an incoming call, the ISP 120 recognizes which receiver homepage has been selected, i.e., clicked on, and calls the receiver (step 438) at a general telephone number of the receiver (step 438). In this case, since it takes a small amount of time to initiate a digital audio channel with the sender (a digital audio connection requires a little more time compared to an analog audio connection since it has to establish a data channel of a standard scheme), if the receiver responds to a call, then the ISP 120 sends a wait message saying "A call from the Internet. Please wait a while." to the receiver. If the receiver has not yet received the call after initiating an audio protocol with the sender, then the ISP 120 delivers a wait message, such as, "We are calling the receiver, please wait a few minutes" to the sender (step 440).

Subsequently, after decoding an audio stream of, for example, G731.1 format received from the sender, the ISP 120 converts it to an analog signal which is transferred to the receiver, and the receiver's analog signal is encoded into a G731 formatted audio stream which is transferred to the sender (step 442), thereby allowing for audio communication between the sender and the receiver (step 444). In this case, if the receiver desires video/audio communication during Internet audio communication, it is determined whether or not a video/audio communication button, such as a special keypad attached to the sending terminal 110, is pressed (step 446). In this case, if the video/audio communication button is pressed, the receiving party hangs up a general telephone to open a digital communication channel after making a connection to the ISP 120 and a Point-to-Point Protocol (PPP) (step 448). In this case, the ISP 120 sends the already stored audio to the sender, for example, "The receiver is preparing digital audio/video communication, please wait a while" (step 450).

If the receiver and a communication channel are interconnected (step 452), the ISP 120 transmits standard start-up protocols (Q931 & H.245) to a receiving terminal (not shown) using the Q931 protocol initially sent by the sender. The receiving terminal receives the standard start-up protocols (Q931 & H.245) to initiate an audio/video connection of the H.323 protocol (steps 454 and 456). In this case, although a digital channel protocol is actually sent by the ISP 120 instead of the sender, since the receiving terminal recognizes that the start-up protocol (Q931 & H.245) standard scheme has been initiated, it has to start an audio/video connection of the H.323 protocol. The outgoing audio/video channel and the incoming audio/video channel of the receiving terminal are open, but the incoming audio/video channel of the sending terminal 110 is not open. This is because the sending terminal 110 has not opened a video data channel since the other party previously did not support video. Thus, since any process of a standard scheme cannot require the other party to open the outgoing data channel, the other party's video is not enabled if the other party is a standard terminal.

After receiving a new capability table from the receiving terminal, the sending terminal 110 checks whether or not all data channels presently connected are open in order of preference of the new capability table. If a corresponding data channel does not exist or a channel of a low preference is open, a data channel of a high preference is forced to be open. In this case, the ISP 120 retransmits the capability table of the receiving terminal to the sending terminal 110. Thus, the sending terminal 110 recognizes that the new capability table has a video capability to enable video communication.

Turning to FIG. 4A, if the ISP 120 determines that the receiving terminal is connected to the ISP 120 through a user's database (step 416), then as shown in FIG. 2B it indicates the connection state, which is displayed within the information window 220 in the receiver's homepage, as "Internet Online: Yes(☐) No( )", and inputs IP address information, which is assigned to a receiver, within the call button window 230 (step 422). In this case, if the sender clicks the call button 230 indicated in a homepage of the sending terminal 110 (step 424), then the web-browser of the sending terminal 110 directly initiates VoIP/H.323 protocols by the receivers IP address determined by HTML to make audio/video communication with the receiver (steps 426 and 428).

While this invention has been particularly shown and described with reference to a preferred embodiment thereof, it should be understood that various alternatives and modifications can be devised by those skilled in the art. Specifically, the invention supports a PSTN/ISDN which is connected to the Internet through an ISP as well as a LAN network which can be connected to the Internet at any time. In the case of the LAN, an HTTP server and a homepage are included within the network so that a sender's HTTP access request can be supported by terminals, while in the case of a PSTN/ISDN, the ISP supports the sender's HTTP access request.

Furthermore, a Graphical User Interface (GUI) and input devices are provided so that a user may exchange a desired network. While GUI and input devices are provided in using the LAN so as to exchange a homepage displayed to the sender, an ISP automatically reflects the connection state and a communication capability of terminals in adopting PSTN/ISDN.

As described in the foregoing, according to the present invention, it is possible to make an audio communication link with an Internet user like a general telephone by calling the other party at a general telephone number, and furthermore to make audio/video communication with the user by straightly accessing the Internet without hanging up a general telephone. This allows for reduction in a communication cost because users do not have to be always connected to the ISP. Additionally, access to a homepage enables a sender to obtain, in advance, information the receiver can support, thereby allowing for audio/video communication under an optimum communication environment.

What is claimed is:

1. A method for conducting real-time communication between sending and receiving terminals in an Internet communications system in which an Internet Service Provider (ISP) is connected between the sending and receiving terminals, the method comprising:

checking whether or not the receiving terminal is connected to a network;

creating a homepage in which a network connection status based on a result of said checking is indicated, registering, in said homepage, an Internet Protocol (IP) address of the ISP if the receiving terminal is not connected to said network, and registering an IP address assigned to the receiving terminal if the receiving terminal is connected to said network;

connecting the sending terminal to said network with Voice over Internet Protocol (VoIP); and initiating a telephone call using a telephone number of the receiving terminal wherein said telephone number is determined by decoding the IP address that is registered in the created homepage.

2. The method of claim 1, wherein the homepage is created by the ISP and accessed by the sending terminal using Hypertext Transfer Protocol.

3. The method of claim 1, wherein the homepage includes communication capability of said network, information about said receiving terminal, network connection status information, video/audio support information, call status information, and a choice menu for a communication mode desired by a sender.

4. The method of claim 1, wherein, after the sending terminal accesses the homepage, the current communication capability and the connection status of a receiving terminal are registered in the homepage.

5. A communication method used by an Internet Service Provider (ISP) connecting sending and receiving terminals in real-time in an Internet communications system in which the ISP is connected between the sending and receiving terminals, the method comprising:

checking whether or not the receiving terminal is connected to the Internet through a subscriber's database to create a homepage in which a network connection status of the receiving terminal is indicated;

registering the ISP Internet Protocol (IP) address if the receiving terminal is not connected, and registering an IP address assigned to the receiving terminal if the receiving terminal is connected;

initiating a communication start-up protocol to connect the sending terminal with a Voice over Internet Protocol (VoIP), and at the same time calling a telephone number of the corresponding receiving terminal if an IP address registered in the created homepage is decoded and called by a web-browser of the sending terminal; and connecting a receiving terminal and a digital communications channel to transmit a standard video/audio protocol to the receiving terminal if video/audio communication is requested from the sending terminal during the telephone call.

6. The method of claim 5, further comprising;

the sending terminal receiving a capability table created by the receiving terminal; and opening or closing a channel wherein said channel is determined by referring to a stored preference in the capability table.

7. The method of claim 5, further comprising;

advising said sending terminal and said receiving terminal that said calling is being performed over the internet, wherein said advising is performed immediately after said receiving terminal and said digital communications channel are connected; and requesting a predetermined wait time during which time said sending terminal will remain idle until a connection is established.

8. An internet communication system enabling communication between a sending device and a receiving device, said system comprising:

an ISP connected to said sending and receiving devices and operable to determine whether said receiving device is in a state whereby it can receive a communication from said sending device via the internet, and further operable to register an IP address of said receiving device if said receiving device can receive said communication from said sending device and register an IP address of said ISP if said receiving device cannot receive said communication from said sending device;

said system further comprising:

a homepage controllable by said receiving device and said ISP, wherein the homepage comprises connection status information of said receiving device and is accessible by said sending device, and if said ISP has registered the IP address of the receiving device, a connection is immediately established between the receiving device and the sending device so the sending device can transmit said communication to said receiving device, and if the ISP has registered the IP address of the ISP, and said sending device has indicated within the homepage that a connection to the receiving device is desired, the ISP requests a connection with said receiving device, then only if the receiving device responds to said request indicating that a connection is desired, a connection is established between the receiving device and the sending device so the sending device can transmit said communication to said receiving device.

9. An internet communication system according to claim 8, wherein said communication comprises voice and video data.

10. A method for conducting real-time communication between sending and receiving terminals in a communications system in which an Internet Service Provider (ISP) is connected between the sending and receiving terminals, the method comprising:

determining if the receiving terminal has an established communication channel with the ISP;

creating a homepage at the ISP operable to indicate a connection status of the receiving terminal based on a result of said determining;

maintaining, in said homepage, an Internet Protocol (IP) address of the ISP if the receiving terminal does not have an established communication channel with the ISP, and maintaining an IP address assigned to the receiving terminal if the receiving terminal does have an established communication channel with the ISP;

establishing a Voice over Internet Protocol (VoIP) connection between the sending terminal and the ISP; and initiating a telephone call by using the IP address that is registered in the created homepage, wherein the telephone call is a VoIP call directly between the sending terminal and the receiving terminal if the IP address of the receiving terminal is maintained in the homepage, and the telephone call is between the ISP and a regular telephone associated with the receiving terminal if the IP address of the ISP is maintained in the homepage.

11. A real-time communication device in an Internet communication system in which real-time communication is available, the device comprising:

means for determining whether a network connection has been established and further operable to set up an Internet Protocol (IP) address of an Internet Service Provider (ISP) in a homepage if a receiver is not connected to the Internet and to establish an IP address of the receiver in the homepage if the receiver is connected to the Internet; and an ISP operable to, if the homepage is accessed by a web-browser of the terminal, create a homepage in which a network connection status of the receiver available from a subscriber's database is indicated and in which the IP address of the ISP is registered, and if the registered IP address is called by a terminal, place a telephone call with a sender via a Voice over Internet Protocol (VoIP) and with the corresponding receiver at a predetermined telephone number.

* * * * *